Oct. 13, 1964   M. FRENZEL   3,152,552

RADIAL SEAL FOR ROTARY PISTON MOTORS

Filed June 6, 1963

Inventor
Manfred Frenzel

By

Atty

United States Patent Office 3,152,552
Patented Oct. 13, 1964

3,152,552
RADIAL SEAL FOR ROTARY PISTON MOTORS
Manfred Frenzel, Neuss (Rhine), Germany, assignor to Goetzewerke Friedrich Goetze Aktiengesellschaft, Burscheid, near Cologne, Germany, a corporation of Germany
Filed June 6, 1963, Ser. No. 286,893
3 Claims. (Cl. 103—130)

The invention disclosed herein is concerned with a radial seal, for rotary piston motors, which is, with the aid of auxiliary spring means, pressed against the inner wall of the enveloping body.

It is known to use for the sealing of a rotary piston motor bar-like members which are inserted in grooves formed along the piston. An undulating spring was generally inserted in grooves extending about the piston, so as to support the sealing bar and to cause it to engage the inner wall of the enveloping body already in the initial condition of the motor. Upon using a plurality of sealing bars disposed in one groove, there are in given cases employed a plurality of springs exerting different pressure.

It was found in practice that confusion may occur incident to the assembly of the bars and springs, resulting in erroneous placement of parts, or that the insertion of the auxiliary spring may be inadvertently omitted. Moreover, the assembly is rendered difficult by the separation of the springs from the bars.

According to the invention, it is proposed to connect a given spring with the corresponding bar so that the two parts form a unit ready for assembly in the piston. The spring must thereby be mounted with sufficient freedom of motion, so that it can freely function.

The spring is advantageously embedded in an elastic synthetic material which may be porous, and is with such embedding material secured in or within the corresponding sealing bar.

It is also feasible to secure the spring with at least one end thereof disposed in a slot formed in the sealing bar. The back of the bar may be recessed and slots for receiving the ends of the spring may be formed in extensions at the opposite ends of the corresponding recess.

Another possibility resides in fastening one end of the spring at the back of the sealing bar, with the other end of the spring positioned with sufficient play to assure free spring action.

The definite positioning of the spring at the back of the sealing bar facilitates the assembly operations, extends the useful life of springs, especially in the case of small springs which are particularly vulnerable and sensitive to displacement, and improves the guidance for the sealing bars and therewith the sealing function thereof.

Embodiments of the invention are shown in the accompanying drawings, wherein

Figure 1:
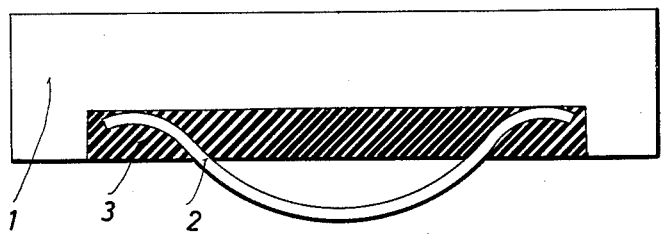
Figure 2:
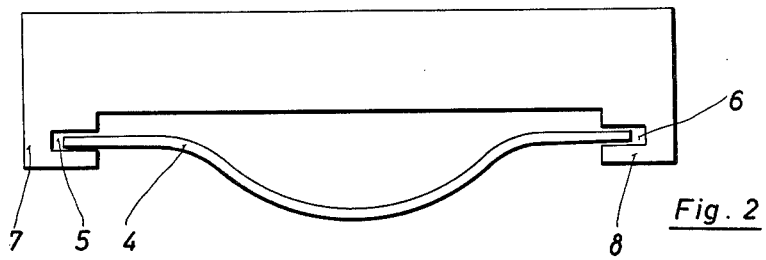
Figure 3:
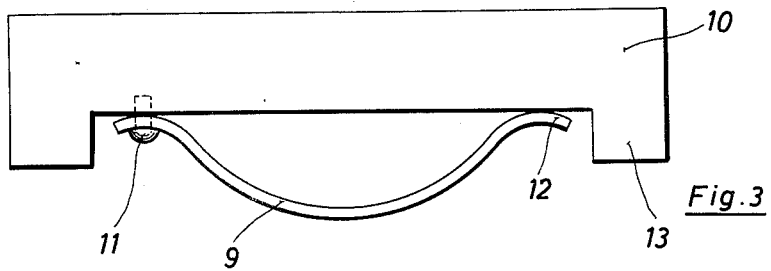

FIG. 1 indicates a sealing bar with a recess formed therein containing a synthetic material in which is embedded a spring;

FIG. 2 illustrates a sealing bar with a recess formed therein containing a spring held in slots formed in extensions defining the recess; and FIG. 3 represents a sealing bar having a recess formed therein in which is disposed a spring fastened to the bar at one end thereof.

In FIG. 1, numeral 1 indicates the sealing bar provided with a spring 2 which functions to press the bar into sealing engagement with the inner wall of an enveloping body (not shown), the spring 2 being partially embedded in a synthetic material 3 contained in the recess formed at the back of the bar, and being free to exert its force.

In FIG. 2, the spring 4 is held at its opposite ends within slots 5 and 6 formed in the extensions 7 and 8 of the sealing bar, which delimit the recess formed at the back thereof.

In FIG. 3, the spring 9 is disposed in the recess formed at the back of the sealing bar 10 and fastened thereto at one end by means of a member 11, the free end 12 of the spring being spaced from the extension 13 so as to have sufficient play for exerting its force.

An elastic synthetic material may also be disposed in the recess of the embodiments according to FIGS. 2 and 3, in addition to the mechanical fastening of the spring, so as to serve as a damping element.

Changes may be made within the scope and spirit of the appended claims which define what is believed to be new and desired to have protected by Letters Patent.

I claim:
1. A radial seal for a rotary piston motor, comprising an oblong sealing member for disposal in a groove formed in a rotary piston, a recess formed at the back of said bar-like sealing member, elastic synthetic material disposed in said recess, an auxiliary spring for exerting pressure on said bar-like sealing member, and said spring having its ends embedded in said elastic material.
2. The invention as defined in claim 1, wherein the mid-portion of said spring is bowed outwardly away from said bar-like member.
3. The invention as defined in claim 2, wherein the ends only of said spring are embedded in the said elastic material.

References Cited in the file of this patent
UNITED STATES PATENTS

| | | |
|---|---|---|
| 49,391 | Durre | Aug. 15, 1865 |
| 980,771 | Glamzo | Jan. 3, 1911 |
| 1,058,496 | Thompson | Apr. 8, 1913 |
| 1,766,872 | Berglund | June 24, 1930 |
| 2,899,940 | Gibbs et al. | Aug. 18, 1959 |

FOREIGN PATENTS

| | | |
|---|---|---|
| 1,169,444 | France | Sept. 8, 1958 |
| 858,918 | Germany | Dec. 11, 1952 |